United States Patent [19]

Weisner

[11] 4,401,894
[45] Aug. 30, 1983

[54] AUTOMATIC UNINTERRUPTED D.C. POWER SOURCE SWITCH

[75] Inventor: Daniel M. Weisner, Mount Airy, Md.

[73] Assignee: Professional Products, Inc., Bethesda, Md.

[21] Appl. No.: 220,257

[22] Filed: Dec. 24, 1980

[51] Int. Cl.³ ............................................. H02J 7/00
[52] U.S. Cl. ........................................ 307/64; 307/87
[58] Field of Search ...................... 307/64, 65, 66, 67, 307/68, 85, 86, 87

[56] References Cited

U.S. PATENT DOCUMENTS

| 3,577,003 | 5/1971 | Behr | 307/66 |
| 3,631,257 | 12/1971 | Behr | 307/66 |
| 3,696,286 | 10/1972 | Ule | 307/66 X |
| 3,767,933 | 10/1973 | Bogue et al. | 307/66 X |

FOREIGN PATENT DOCUMENTS 766414 8/1967 Canada ................. 307/66

Primary Examiner—G. Z. Rubinson
Assistant Examiner—James L. Dwyer
Attorney, Agent, or Firm—Harvey B. Jacobson

[57] ABSTRACT

An automatic uninterrupted direct current power source switch utilizes a voltage controlled latching relay for switching over between direct current voltage sources, such as batteries, which supply power to a common load, with virtually no interruption in load current being experienced during the switchover. The power source switch is intended to be used with two independent direct current voltage sources in conjunction with a recording device which receives its power through either one or the other of the voltage sources, depending on the state of the latching relay. The latching relay will change state when the voltage powering the recording device reaches an adjustable trigger level which is below the nominal working voltage, provided that there is a second direct current voltage source connected to the power source switch and the second direct current voltage source has a terminal voltage near the nominal working voltage.

5 Claims, 6 Drawing Figures

AUTOMATIC UNINTERRUPTED D.C. POWER SOURCE SWITCH

BACKGROUND OF THE INVENTION

1. Field of the Invention

The present invention relates to voltage controlled switches and more particularly pertains to a voltage controlled latching relay that switches between direct current voltage sources, such as batteries, supplying power to a common load, with virtually no interruption in load current being experienced during the switch.

2. Description of the Prior Art

One of the more critical problems confronting developers of voltage controlled switches, which are designed to switch from one direct current voltage source to another, is the momentary loss of load current being delivered to the load as a result of the switchover between power sources. One approach for overcoming this problem has been to provide a mechanical interlock for manually exchanging power sources supplying a common load. In this connection, two power sources are first connected in parallel, and then the primary power source may be removed safely with no load voltage interruption. Of course, this method of switching between power sources to prevent a load interruption requires that an operator be aware of when the principal power source has reached an unacceptable level of power output and further, it requires the physical presence of the operator at the time the switchover occurs.

As to power switchover relays that are automatic in operation, i.e., which require no manual operation but which respond automatically to a power output drop in the principal power source, the prior art devices typically utilize parallelly arranged power sources which either break the circuit during a power switchover, so as to allow a momentary drop in load current, or which maintain the separate power sources in parallel communication at all times, but even though a switchover may occur, a drop in load current will still be experienced due to the fact that the secondary power source will supply charging current into the primary power source. As such, both of these prior art automatic switching methods still permit some drop in load current during a switchover from a first to a second direct current power source.

Accordingly, it can be appreciated that there still exists a need for automatic power switchover devices which permit no drop in load current during such a switchover, and the present invention substantially fulfills this need.

SUMMARY OF THE INVENTION

The general purpose of the present invention, which will be described subsequently in greater detail, is to provide an automatic direct current power source switch which has all of the advantages of similarly employed prior art switches and has none of the above-described disadvantages. To attain this, the present invention provides an automatic direct current power source switch that utilizes a voltage controlled latching relay for switching between direct current voltage sources, such as batteries or the like, to a common load with virtually no interruption in load current. The invention is intended to be used with two independent direct current voltage sources in conjunction with a recording device receiving power from either one or the other of the voltage sources, depending on the state of the latching relay. The latching relay will change state when the voltage powering the recording device reaches an adjustable trigger level somewhere below the nominal working voltage, if and only if there is a second direct current voltage source connected to the invention and if the second direct current voltage source has a terminal voltage near the nominal working voltage.

During the switching interval of the latching relay, the load or recording device will lose its electrical connection to both of the direct current voltage sources for a brief instant, and thus charge storage elements are connected across the output terminals to sustain the load voltage during this interval. Semiconductors are provided as a means of maintaining the load voltage during the switchover when the charge storage elements would otherwise be prohibitively large. Further, a switch is provided to reset the invention to the original state, and an indicator light emitting diode warns the operator of the existence of a low battery. Through the use of a latching relay, the power consumption is reduced to a minimum regardless of the state of the latching relay, i.e., no holding current is necessary.

It is therefore an object of the present invention to provide an automatic direct current power source switch that has all of the advantages of similarly employed prior art power source switches and none of the disadvantages.

It is another object of the present invention to provide an automatic direct current power source switch which may be easily and economically manufactured.

It is a further object of the present invention to provide an automatic direct current power source switch that is durable in construction and reliable in operation.

Still another object of the present invention is to provide an automatic direct current power source switch which provides a solution to the problem of costly interruption of a remote video taping session caused by a video tape recorder battery reaching a critically low level, thus requiring a replacement thereof.

Yet another object of the present invention is to provide an automatic direct current power source switch that has an adjustable trigger level for causing an automatic switchover from one power source to another.

Even another object of the present invention is to provide an automatic direct current power source switch which eliminates prohibitively large charge storage elements in a switchover circuit.

A still further object of the present invention is to provide an automatic direct current power source switch that reduces the power consumption during a switchover from one power source to another through the use of a latching relay.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
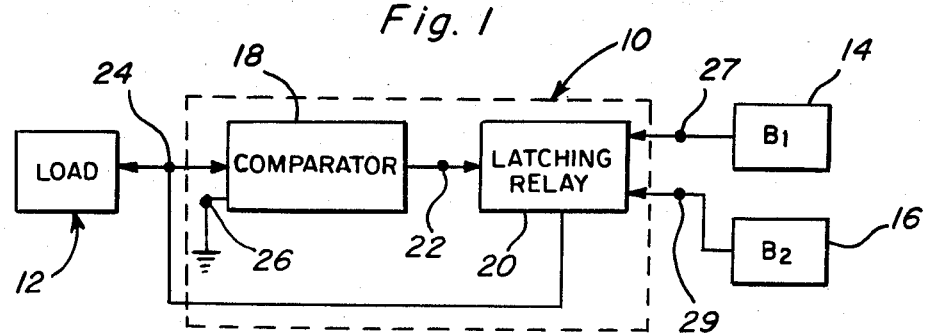
FIG. 1 is a block diagram illustrating the general assembly of the automatic uninterrupted direct current power source switch forming the present invention.

With reference now to the drawings and in particular to FIG. 1, there is shown in block diagram form an automatic uninterrupted direct current power source switch, for providing uninterrupted load current to a load during a power source switchover, which embodies the principles and concepts of the present invention and which is generally designated by the reference numeral 10. In this respect, it can be seen that the automatic power source switch 10 is electrically connectible between a load 12, which in this case is envisioned as a video tape recorder, or the like, and two independent direct current voltage sources 14, 16, which most likely would be batteries and which are further designated as $B_1$ and $B_2$ to represent the same. Further, it can be seen that the power source switch 10 utilizes a comparator 18 in series connection with a latching relay 20. In this regard, the comparator 18 and the latching relay 20 have a common connection terminal 22, and further, both the comparator and the latching relay are electrically connected to the load 12 at terminal 24. Additionally, the comparator 18 is connected to the system ground at terminal 26, while the latching relay 20 is connected at terminals 27, 29 to the respective direct current power sources 14, 16.

Figure 2:
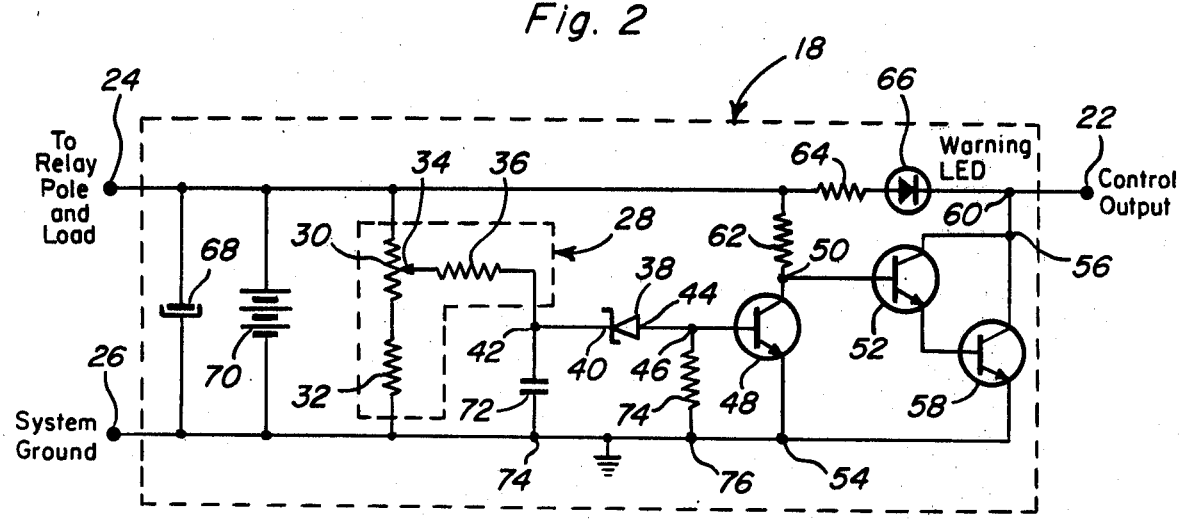
FIG. 2 is a schematic diagram of the electronic circuit arrangement of the comparator depicted in FIG. 1.

With reference now to FIG. 2 of the drawings, a description of the electronic components forming the comparator 18 will be provided. In this connection, it can be seen that the comparator 18 includes the system ground at terminal 26, the terminal 24 which is connectible to the load 12 and the terminal 22 which is connectible to the latching relay. As can be appreciated, the voltage between terminals 24 and 26 is the load voltage sensed by comparator 18. With respect to the circuitry per se of the comparator 18, a voltage divider 28 is defined by resistance 30 in series connection with a resistor 32 and having a pickoff contact 34 movably positionable along the resistance 30 with a resistor 36 in series connection therewith. In this regard, the voltage divider 28 will pickoff a predetermined constant value of the voltage between terminals 24 and 26 wherever the constant voltage value is set.

Element 38 is a zener diode which is a two-layer semiconductor device that, above a certain reverse voltage (the zener value), will experience a sudden rise in current. If forward-biased, the diode 38 is an ordinary rectifier, but when reverse-biased, the diode exhibits a typical knee, or sharp break, in its current-voltage graph. The voltage across the diode 38 remains essentially constant for any further increase of reverse current, up to the allowable dissipation rating. In the manner of use in the present invention, the zener diode 38 has a zener breakdown voltage that is somewhat less than the voltage at which the circuit of the present invention will cause a switchover from one to the other of the direct current power sources 14, 16. In a preferred embodiment of the present invention, it is envisioned that the load circuit would draw 12 volts, so that when it gets to around 11.3 volts, it would be desirable for the circuit to trip to an auxiliary power source. As such, the zener diode 38 might typically utilize a breakdown voltage of around 10 volts.

With further reference to FIG. 2, it can be seen that the cathode 40 of the zener diode 38 is connected at terminal 42 to the resistor 36, while the anode 44 of the zener diode is connected at terminal 46 to the base of an NPN transistor 48. By the same token, the collector of the transistor 48 is connected at terminal 50 to the base of a second transistor 52, and the emitter of the transistor 48 is connected to the system ground at terminal 54.

The collector of transistor 52, which is also an NPN transistor, is connected at terminal 56 to the collector of a third NPN transistor 58, while the emitter of transistor 52 is connected to the base of transistor 58. The emitter of transistor 58 is then connected to the system ground at terminal 54, while both of the collectors of transistors 52 and 58 are connected to the control output leading to the latching relay 20 at terminal 60.

Also illustrated as being connected between terminals 50 and 60 are a pair of resistors 62, 64 and a warning light emitting diode 66, all in series connection therewith. In this connection, resistor 64 is a current limiting resistor for the warning light emitting diode 66 in case it is not switching or there is no battery for the circuitry of the present invention to switch to. In this regard, the warning light emitting diode 66 serves as an indicator that the battery power is low.

Further illustrated in FIG. 2 is a capacitor 68, which is typically in the order of 2000 microfarads and which is provided to supplement the power to the load 12 during a typical 10 milli-second switchover interval. In this regard, a small battery 70 may also be utilized to supplement the power supply to the load 12 during the switching interval, so that either the capacitor 68 or the small battery may be used in combination or independently of one another. In any case, they are only needed during the switching interval, and the battery 70, if used, will be a battery having the same terminal voltage as required by the load.

A second capacitor 72 is shown connected between the terminal 42 and a terminal 73, which is connected to the system ground, and is utilizable to reduce noise interference, noise triggering, etc. As such, the capacitor 72 can be quite small in size, something in the order perhaps of 10 picofarads. Lastly illustrated in FIG. 2 is a resistor 74 connected between the anode 44 of the zener diode 38 at terminal 46 and the system ground at terminal 76.

Figure 3:
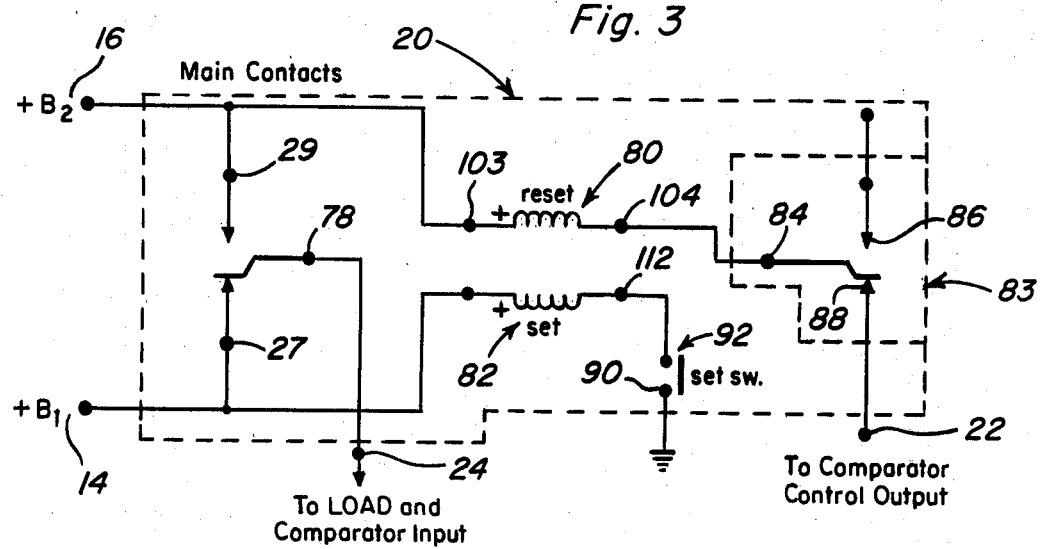
FIG. 3 is a first embodiment of latching relay which may be utilized in the circuit of the present invention as shown in FIG. 1.

With reference to FIG. 3 of the drawings, a first embodiment of the latching relay 20 will now be described. In this connection, it can be seen that the latching relay 20 includes terminals 27, 29 which are respectively connectible to the first and second direct current power sources 14, 16, and further includes the aforementioned terminal 24 by which the relay is electrically connected to the load 12. Additionally, terminal 22 is illustrated whereby the latching relay 20 is brought into electrical communication with the aforedescribed comparator 18. With respect to the electronic circuitry of the latching relay 20 itself, it can be seen that the battery input terminals 27, 29 are respectively in communication with a swinging contact 78 that switches back and forth between the two. Swinging contact 78 also connects back to the comparator 18 and the input voltage load 12 at terminal 24. As such, it can be appreciated that the circuit senses the voltage provided by either battery 14 or 16 at terminal 24. Also illustrated is a reset relay 80 connected to the terminal 29 of battery 16 and a set relay 82 connected to the terminal 27 of battery 14. In this regard, the reset relay 80 has a swinging contact 84 which may be directed to a control contact 83 and specifically to either contact 86 or 88, depending on the positioning of the relay. In this connection, contact 86 of control contact 83 is directed to an open circuit, while contact 88 provides an electrical connection to terminal 22 which is the comparator control output. By the same token, the set coil relay 82 is connected at terminal 90 to the system ground and includes a set switch 92 serially connected therein.

Figure 4:
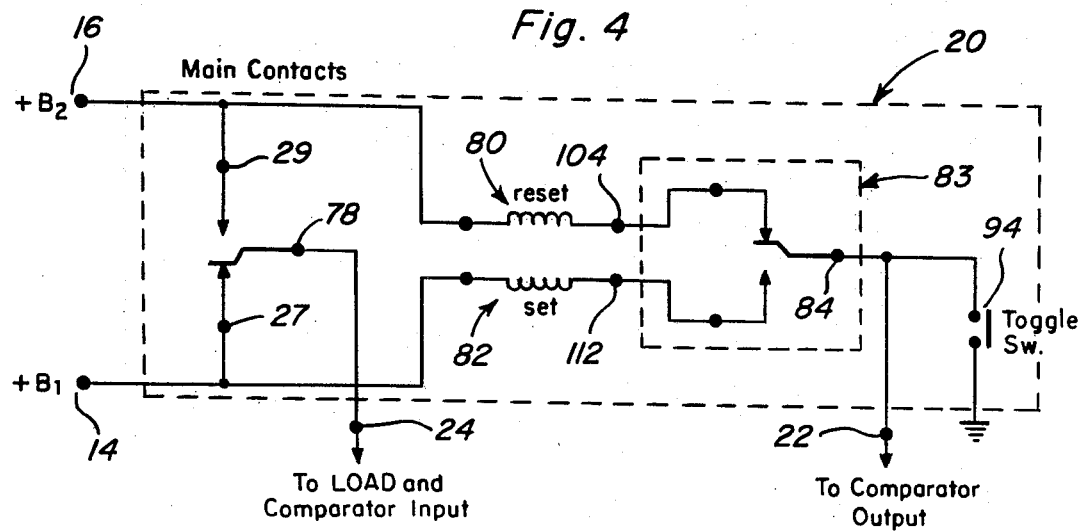
FIG. 4 is a second embodiment of the latching relay schematically illustrated in FIG. 1.

FIG. 4 illustrates a slightly modified embodiment of the latching relay 20 illustrated in FIG. 3. In this connection, it can be seen that the control contact 83 now has its swinging contact 84 in direct connection with the comparator output terminal 22, while a toggle switch 94 is attached between system ground and the swinging arm contact 84. Effectively, this arrangement of the latching relay 20 provides for toggling back and forth from one battery to the other without any manual operation being required. Additionally, the toggle switch 94 permits a manual toggling, if desired. Again, however, this latching relay embodiment also will not switch automatically to a secondary power source unless there is a good battery in the other compartment.

Figure 5:
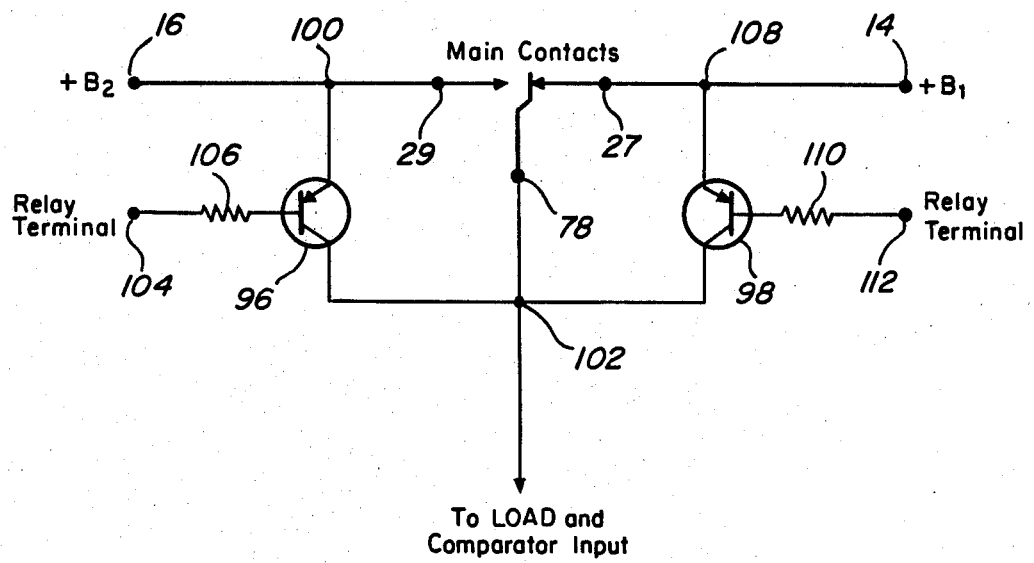
FIG. 5 is a modified embodiment of part of the switching circuitry forming a portion of the latching relay.

FIG. 5 illustrates the use of a pair of PNP transistors 96, 98 which may be selectively used in the latching relay 20 to aid in a power switchover in those cases where load current is excessive. In this regard, the transistor 96 has its emitter connected to the direct current voltage source 16 at terminal 100, its collector connected at terminal 102 to the load and comparator 18 input, and its base connected to a first relay terminal 104 as shown in FIGS. 3 and 4. Further, a resistor 106 is connected between the terminal 104 and the base of the transistor 96. Similarly, transistor 98 has its emitter connected at terminal 108 to the first voltage source 14, its collector to the terminal 102 leading to the load and comparator input, and its base connected in series with a resistor 110 to a second relay terminal 112, also illustrated in FIGS. 3 and 4.

Figure 6:
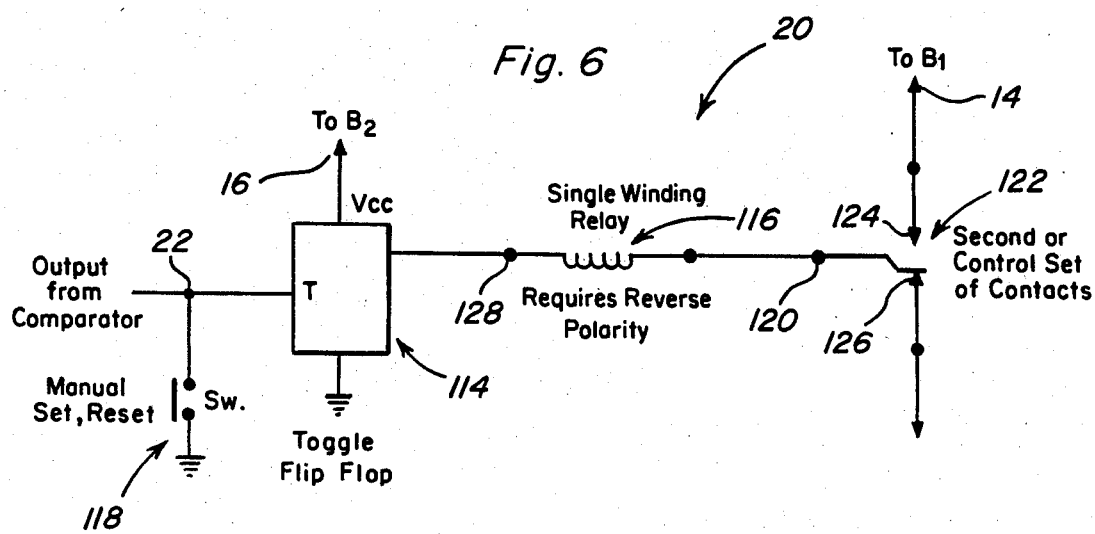
FIG. 6 is a third embodiment of the latching relay schematically illustrated in FIG. 1.

Finally, FIG. 6 illustrates a third embodiment of the latching relay 20 in which a flip-flop 114 is utilized in combination with a single winding type of relay 116. This embodiment is effectively a reverse polarity type of arrangement and includes the flip-flop 114 connected to the output of the comparator at terminal 22 along with a manual set, reset switch 118 connected thereto. The signal winding relay 116 is serially connected to the swinging contact 120 associated with a second or control set of contacts 122. In this connection, the swinging contact 120 is alternately positionable between a contact 124 for effecting an electrical connection to DC power source 14 and contact 126 which is directed to system ground. By the same token, the toggle flip-flop 114 is connectible to the second DC power source 16 as well as being in series connection with the single winding relay 116 at terminal 128.

Inasmuch as the structure of the electronic circuitry of the present invention has now been particularly described and illustrated, a description of the manner of operation of the various embodiments thereof will now be provided. Specifically and with particular reference to FIG. 1, it can be seen that the load 12 will be powered alternatively by the direct current power source 14 or the direct current power source 16. In between the load 12 and the power sources 14, 16, the automatic direct current power source switch 10 serves to detect when one or the other of the power sources 14, 16 is no longer delivering the required power output and then serves to effect a switch from the power source currently on line over to the standby power source. Effectively, the automatic direct current power source switch includes the comparator 18 for sensing the load voltage and the latching relay 20 which effects a switch from one to the other of the power sources 14, 16 in response to a sensed condition by the comparator 18. This sensed condition, of course, is the aforedescribed drop in load voltage caused by a decline in the direct current power provided by one or the other power sources 14, 16.

With reference to FIG. 2, the comparator 18, utilizable in the circuitry of the present invention and as above structurally described, senses the load voltage across the terminals 24, 26, such load voltage being further sensed by the voltage divider 28. As well understood by those with ordinary skill in the art, the zener diode 38 is always conducting until it gets below a certain voltage value, at which time the diode shuts down. Once the zener diode 38 quits conducting, the transistor 48 similarly ceases conducting and its collector goes high driving the transistors 52 and 58 into saturation. At this point of operation, the collectors of transistors 52, 58 are at ground, so as to light the light emitting diode 66 for an instant of time. Additionally, when the collectors of the transistors 52, 58 are at ground, a particular relay will be tripped within the latching relay 20, as will be subsequently described with reference to the other figures of the drawings. In this regard, the relay contacts are connected to the terminal 22, as well as to one or the other of the batteries 14, 16. Actually, when low voltage is sensed within the comparator 18, the collector of transistor 58 goes low and this signal is received at one coil of the relay, the other side of the relay coil being connected to the battery that will be switched onto line. Accordingly, if there is no battery in the other compartment, i.e., no secondary direct current power source, no switch will occur. At the same time that a switch between batteries 14, 16 does occur, either one or both of the capacitor 68 and the battery 70 may be provided in parallel connection with the load circuit so as to further reduce any likelihood of a load current drop during the switchover, as has been previously described relative to the discussion of FIG. 1 above.

As to the operation of the latching relay 20, and specifically with reference to the embodiment of FIG. 3, it can be seen that this particular latching relay is running off of the battery or direct current power source 14 since the swinging contact 78 is shown in operable electrical connection with the contact or terminal 27. At the same time, it can be seen that the swinging contact 84 of control contact 83 is in electrical connection with the contact 88 so as to establish a connection between the latching relay 20 and the comparator 18. In this regard, the terminal 22 is directed to the output of the comparator 18, i.e., the collectors of the two transistors 52, 58 that saturate during an operation of the present invention. As priorly discussed, when the voltage goes low from power source 14, the transistors 52, 58 saturate, thus driving contact 88 to ground which in turn takes the reset relay 80 to ground at terminals 103 and 104. As long as terminal 103 is connected to the auxiliary battery 16, it will permit current to flow therethrough to the reset coil 80 so that the same switches states. At this precise moment of operation, the relay main contacts 78 and 29 are coming into electrical connection together, and there is a short switchover interval where the capacitor 68 and/or the battery 70 holds the charge. As such, electrical contacts 29, 78 are brought into communication with one another so as to permit the load to draw power from battery 16.

When the battery or direct current power source 16 gets low in this particular arrangement, the transistors 52, 58 will again saturate, thus bringing terminal 22 to ground. However, at this point of the operation, it can be seen that the terminal 22 on the latching relay 20 is not connected to any of the other circuit components, so that all that occurs is that the warning light emitting diode 66 lights up. This lighting of the diode 66 indicates that the second battery 16 is now dead or at least around 11 to 11.3 volts, and it is time to change over to another power source. This particular embodiment of the circuit then does not switch automatically back to the original direct current power source 14. As such, either of the batteries might at this time be replaced and, if desired, the set switch 92 could be activated to bring the latching relay 20 back into its original position illustrated in FIG. 3. Accordingly, this embodiment of the present invention has the provision for changing from battery 14 to battery 16 automatically, and a manual operation for changing from battery 16 back to battery 14. In this regard, contact 86 is connected to an open circuit.

As to the operation of the embodiment of the latching relay 20 illustrated in FIG. 4, it can be seen that battery 14 is again illustrated as being connected to the load 12 so that the main contacts 27, 78 are in electrical communication. In this embodiment, the comparator output as sensed at terminal 22 is in series connection with the swinging arm 84 of the control contact 83. Accordingly, when the battery 14 is connected to the load 12 at this point and the comparator input, the swinging contact 84 will go to ground along with the relay 80 when the voltage goes low. This occurs, of course, due to the saturation of the aforementioned transistors 52, 58. As long as there is a battery 16 in the B2 position, the relay 80 will be reset in the opposite position so that the load is now running off of the power provided by the battery 16. By the same token, when the voltage output from battery 16 goes low, the comparator output will drop and saturate, and accordingly, the swinging contact 84 will again go to ground. At this point of operation, the swinging contact 84 is connected at terminal 112 to the set relay 82, which is the other end of the set coil winding, and as long as the battery 14 is at an acceptable power level, the latching relay 20 will switch back from the battery 16. As such, this embodiment of the present invention provides for automatic toggling from one power source to the other without any manual operation being required. Further, the aforementioned toggle switch 94 may be utilized to ground the swinging contact 84 at any time so as to effect a transfer from one to the other of the power sources 14, 16. Again, it is pointed out that no switching will occur unless there is a good battery in the compartment being switched to.

As to the operation of the main contact arrangement illustrated in FIG. 5, it can be seen that the battery 14 is again connected to load 12 due to the electrical connection of contact 27 to swinging contact 78. When a low voltage is sensed at swinging contact 78, the comparator input senses the low voltage and the output of the comparator 18 will saturate so as to go to ground. As such, terminal 104 of the relay 80 will go to ground through the control contacts of the relay, as well as grounding the coil to the switch and the relay coil per se. Accordingly, additional current paths for the load during the interval of switching is provided. Specifically, looking at the schematic arrangement of FIG. 5 in combination with the comparator circuit shown in FIG. 3, it can be seen that if the load voltage is getting low, swinging contact 84 and contact 88 will saturate, along with terminal 104, thus going to ground so as to cause a switch from battery 14 to battery 16. At the moment terminal 104 goes to ground and is switching to battery 16, transistor 96 will saturate so as to provide a path for the battery 16 to the load, while the relay is in transition. As can be appreciated, the relay will be switching between main contacts 27, 29 and the transistor 96 is across those contacts so that it will saturate and supply some current to the load during the interval. Batteries can be used when there is an excessive current to draw on the load 12, more than can normally be handled with a capacitor or battery. Again, it is pointed out that this entire operation occurs within an interval of approximately 10 milli-seconds, and, of course, the same method of operation occurs with respect to the transistor 98.

Finally, reference is made to the operation of the flip-flop embodiment of the latching relay 20 as illustrated in FIG. 6. Specifically, every time the comparator 18 goes low, the point marked T on the toggle flip-flop 114 will effect a change of state so as to either go high or low. In this regard, the state change will alternate respectively between high and low. By the same token then, the relay 116 winding will go positive when the output thereof goes positive, and the other end of the contacts will be at ground so as to cause a switch between states. During such switches between states, it can be seen that the latching relay 20 will be connected to either battery 14 or 16, and the next time the comparator 18 senses an output, a reverse polarity will be sensed by the flip-flop 116, so as to send the switch back to the other battery not being utilized.

With respect to the above description, it should be realized that the optimum dimensional relationships for the parts of the invention are deemed readily apparent and obvious to one skilled in the art and all equivalent relationships to those illustrated in the drawings and described in the specification are intended to be encompassed by the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with at least two independent power sources, a common load, switching means for alternately connecting said load directly to said sources, and voltage level sensing means connected to the switching means for automatically effecting switchover of the load from one of the sources to the other during a switchover interval in response to depletion of energy in said one of the sources, the improvement residing in said level sensing means including voltage comparator means connected to the load for developing a switching signal in response to a drop in load voltage below a predetermined threshold, relay means connected to the switching means and said two sources for maintaining the two sources isolated from each other during said switchover interval and means responsive to said switching signal for maintaining supply of energy to the load from said one of the sources in by-pass relation to the relay means only during said switchover interval preventing any drop in load voltage below the threshold during said switchover interval.

2. The combination of claim 1 wherein said relay means includes means for latching the switching means in two operative positions connecting the load to the sources for supply of load current without any volt drop, and relay coil means connected to said sources and responsive to the switching signal from the comparator means for displacing the switching means between the two operative positions in which said load is directly connected to the sources.

3. The combination of claim 2 wherein said comparator means includes a threshold voltage establishing circuit connected to the load, signal controlling means connecting the circuit to the relay means for supply of the switching signal thereto, and indicating means connected between the signal controlling means and the circuit for signifying said supply of the switching signal.

4. The combination of claim 3 wherein the signal responsive switch means includes a current conducting device connected between each of the sources and the load, and bias control means further connected to the signal controlling means through the relay means for rendering the current conducting devices conductive.

5. The combination of claim 4 wherein said relay means further includes a relay operated switch element and a manually actuated set switch.

* * * * *